Aug. 31, 1965 C. K. BROWN 3,203,101

VECTOR COMPUTER

Filed June 11, 1962 2 Sheets-Sheet 1

Inventor
Clarence K. Brown
by Newton H. Lee, Jr.
Agent

VECTOR COMPUTER

Filed June 11, 1962 2 Sheets-Sheet 2

Inventor
Clarence K. Brown
by Newton H. Lee, Jr.
Agent

United States Patent Office 3,203,101
Patented Aug. 31, 1965

3,203,101
VECTOR COMPUTER

Clarence K. Brown, 6219 E. 6th St., Long Beach, Calif.
Filed June 11, 1962, Ser. No. 201,571
6 Claims. (Cl. 33—76)

The present invention relates to a vector computer and more particularly to a computer useful to pilots in the navigation of aircraft to determine, for example, "course," "heading" and "track speed." It will be understood however that the invention may be availed of to compute problems involving vector diagrams, such as engineering and nautical navigation problems.

Heretofore, computer devices have been available for use by pilots to ascertain information relative to drift or deviation from course caused by side wind or in plotting a course taking side wind into account in the setting of a correct heading to maintain course. However, while such instruments have been generally satisfactory, they have been relatively complex in use, required mental or side calculations and otherwise have required intimate familiarity therewith for ease of use thereof. For example, the most widely used vector computer today requires that the various vectors must be sequentially set on the computer and pencil marking is required to indicate speed prior to rotation of a compass rose to indicate orientation, the pencil mark moving with the compass rose; and in addition no automatic compensation for drift and magnetic variation is provided on the computer.

Accordingly, a primary object of the present invention is to provide a vector diagram computer, for use by navigators and the like, which gives a graphic presentation of the solved vector diagram.

Another object is to provide such a computer wherein the computer may be adjusted, at random, in the consideration of any of the known factors to be considered. This is to say, the computer of the present invention does not require consideration of the known vectors, or the resultant, in a predetermined sequence.

Yet another object is to provide a computer which by simple manipulation, not only visually presents the navigational vector diagram, but also, pursuant to simple manipulation enables correction for magnetic variation and drift, and will show as a result, (1) magnetic course, (2) magnetic heading, and (3) track speed.

More specifically, it is a further object of the invention to provide a rotary dial-type computer having arms and/or slides shiftably supported in a novel manner with respect to the rotary dials, whereby the computer is simple to manufacture and repair if necessary. In this connection, the present invention provides a rotary dial computer device wherein a number of relatively rotatable dials are revolvable about a common center support and are held in assembly therewith by a relatively diametrically shiftable slide, the latter being retained by a simple snap ring engaged with the center support. Further, as an object hereof, there is a novel cooperative connection and relationship between the just-mentioned slide and an interconnected pointer.

Other objects and advantages of the invention will be hereinafter described or will become apparent to those skilled in the art, and the novel features of the invention will be defined in the appended claims.

In the accompanying drawings.

Like reference characters in the several views of the drawings and in the following description designate corresponding parts.

Figure 1:
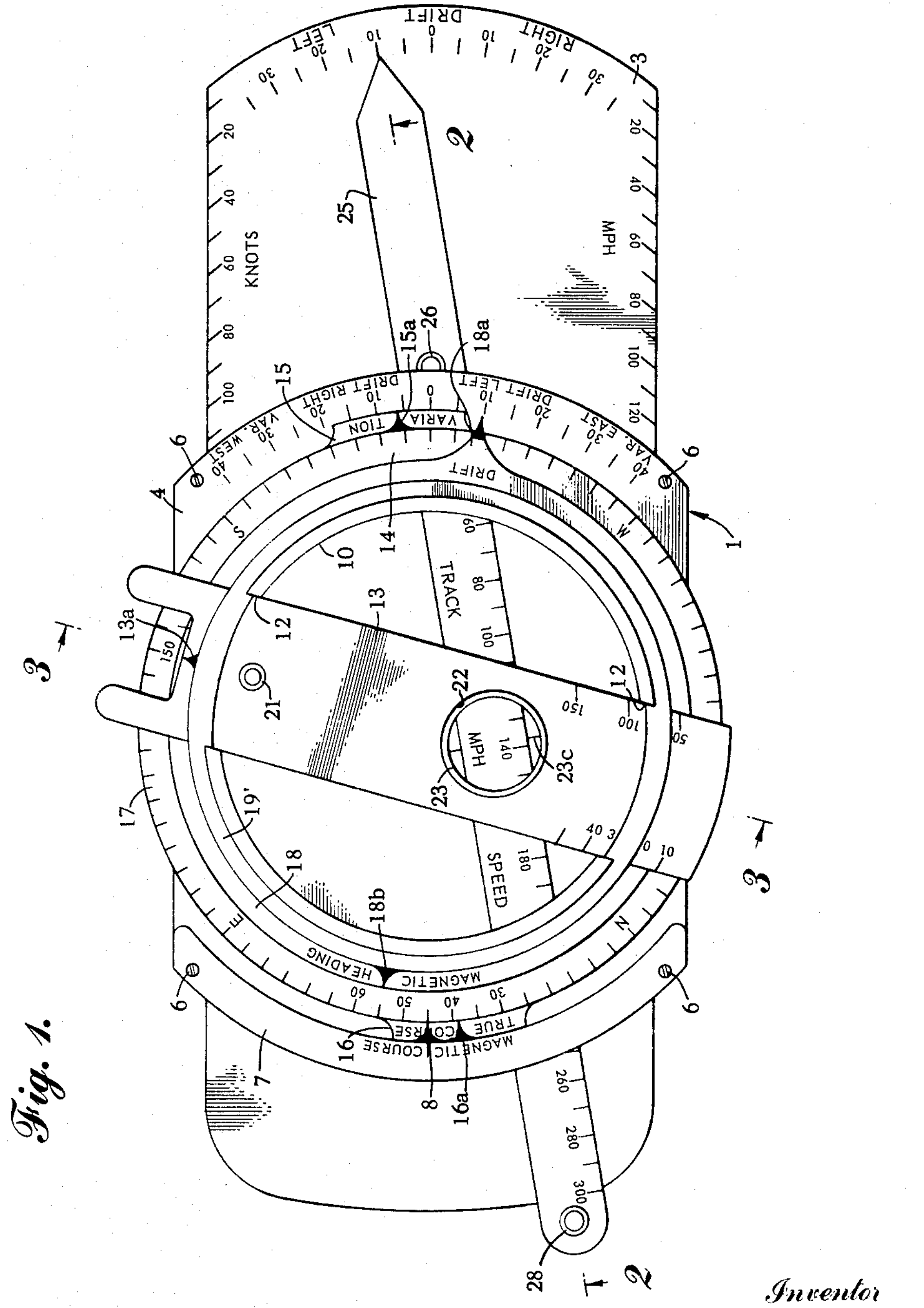
FIG. 1 is a plan view illustrating a vector computer made in accordance with the invention.
Figure 2:
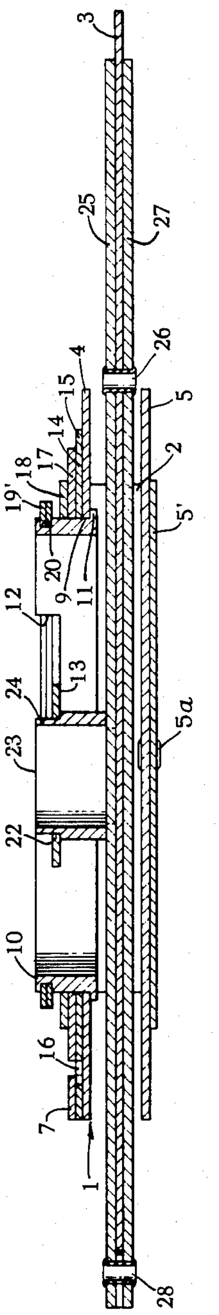
FIG. 2 is a longitudinal sectional view, as taken on the line 2—2 of FIG. 1.

The invention is herein illustrated as comprising an open ended slide frame generally denoted at 1, comprising side rails 2, 2 in which is slidably disposed an elongated slide 3, rectangular plates 4 and 5 interconnecting the rails 2 and being held in assembly therewith in any suitable fashion, such as by screws 6 located at the corners of the plates.

Since the invention is disclosed as embodied in a computer for use in plotting vectors in aircraft navigation, the slide 3 is characterized as an aircraft speed slide and is graduated adjacent one end and along one edge in miles per hour and correspondingly on the opposite edge in knots through speeds of 280 and 250, respectively. The underside of slide 3, as will become apparent hereinafter, is preferably graduated to show m.p.h. and knots in a speed range above 280 and 250, respectively. Likewise, inasmuch as factors in the plotting of the correct heading are drift and magnetic variation, the end of plate 4 adjacent the graduated end of slide 3 is graduated from the center line in degrees of "DRIFT RIGHT" and "VAR. (variation) WEST" to the right of "0" and to the left thereof in degrees of "VAR. (variation) EAST" and "DRIFT LEFT." In addition, plate 4 has at its other end an arcuate member 7 provided centrally with an inwardly directed index 8 and the notation "MAGNETIC COURSE."

The plate 4 has a central opening 9 in which is disposed a locating ring or hub 10, this hub having an inner end flange 11 engaged beneath the plate 4 to retain the hub against outward displacement. Extending diametrically of the hub 10 and shiftably extending through slots 12, 12 therein is a slide 13 which for the present disclosure is characterized as a wind speed slide graduated in knots from 0 to 50 on one side edge and 0 to 150 on the other edge. The high wind speed graduations are to be referred to when the aircraft speed slide is reversed for use in the navigation of high speed craft, as will hereinafter appear.

Revolvable about the hub 10 is a ring 14 which may be characterized as a variation ring inasmuch as it serves, as will hereinafter be described in greater detail, to enable simple consideration of east or west variation in determining a true course corrected for the variation from the magnetic course. At diametrically opposite locations the variation ring 14 is formed with radial projections 15 and 16. The projection 15 is marked "VARIATION" and has an index **15*a*; while the projection 16 is marked "TRUE COURSE" and has an index 16*a*. Hence, angular adjustment of ring 14 whereby "VARIATION" index 16*a* is aligned with the graduations indicative of east or west variations will correspondingly oppositely angularly adjust the "TRUE COURSE" index 16*a***.

Slidably overlying the variation ring 14 and preferably being exposing only the projections 15 and 16 of the latter, is a compass rose or protractor ring 17 graduated to show the 360° of the compass. This protractor ring also revolves about the hub 10 and is of such diameter as to project laterally beyond the sides of slide frame 1 and to be easily manipulated at opposite sides thereof.

It will now be observed that with the variation ring index 15_a_ directed towards an indication of a known degree of east or west variation, the setting of the protractor ring at a position whereat the true course index 16_a_ is directed towards a given compass heading will cause the magnetic course index 8 to indicate the corrected course on the protractor.

A further ring 18 which is characterized as a drift ring is slidably disposed on the protractor ring 17 and is also revolvable about the hub 10. This drift ring has an outwardly projecting pointer or index 18_a_ marked with the legend "DRIFT" and diametrically opposite thereto is a further index 18_b_ and the legend "MAGNETIC HEADING." Hence, upon angular adjustment of this drift ring 18 so that the drift index 18_a_ indicates the degree of "DRIFT LEFT" or "DRIFT RIGHT" as noted on the plate 4, the index 18_b_ will indicate on the protractor a magnetic heading taking into account the noted drift.

It will be noted that in accordance with a salient feature of the invention the previously described wind speed slide 13 projects through slots 12 in hub 10 into overlying relation to the drift ring 18, and, therefore, provides means for retaining the rings 14, 17 and 18 on the hub 10. Cooperative with the slide 13 to retain the latter against displacement axially of the hub is a split lock ring 19' resiliently engaged in a circular groove 20 in the outer end of the hub 10. Endwise displacement of the slide 13 from the hub 10 is suitably prevented as by means of a projection 21 on the slide which may be in the form of a rivet or the like engageable with the snap ring at its inner periphery.

Figure 3:
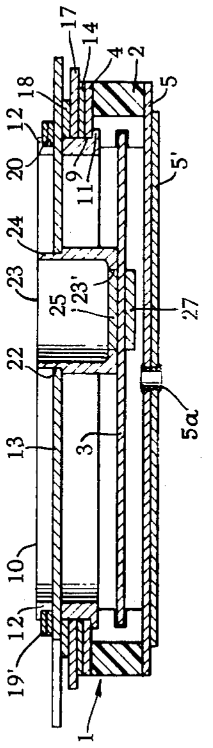
FIG. 3 is a transverse sectional view as taken on the line 3—3 of FIG. 1.

The wind speed slide 13 is provided with an opening 22. In this opening is disposed an open ended idler bushing 23 having a reduced outer end 24 providing a shoulder engageable by the slide 13. This idler slidably engages the confronting surface of the aircraft speed slide 3, and as seen in FIG. 3, the inner end of the idler is slotted at 23' to provide means for slidably connecting the idler to a track speed scale and drift pointer 25 which is pivotally connected to the aircraft speed slide 3 as by a rivet 26. This pointer is graduated to show aircraft track speed (i.e., speed compensating for tail wind effect). The range of track speed inscribed on the scale 25 is related to low speed markings on the wind speed slide.

As previously indicated, the wind speed slide 13 is also provided with a higher range of graduations and also the aircraft speed slide 3 is graduated as shown in FIG. 1, to indicate a low range of speed, and on the reverse side to show a higher range of speed, as will be readily understood. Therefore, the aircraft speed slide 3 has a second track speed scale and drift pointer 27 pivoted on rivet 26 and joined to pointer 25 by a rivet 28 at the end of the pointer projecting beyond the end of the slide 3 remote from the pivot rivet 26. It will be apparent that the slide 3 is accordingly reversible in the guide frame 1 by endwise removal from the latter and reinsertion, with either of the pointers 25 or 27 slidably engaged in the slot 23' in idler 23 and with the track speed scale markings on the respective pointer visible through the open outer end of the idler 23.

It will now be observed that longitudinal movement of the wind speed slide 13 will effect pivotal movement of the track speed scale 25 or 27. Since wind from a direction other than the direct line of travel causes drift, each scale 25 and 27 has a drift pointer which will indicate drift "RIGHT" or "LEFT" in degrees as shown on the end of the aircraft speed slide to which the pointers are pivoted. In order to relate wind speed to direction relative to the aircraft, the slide 13 is provided with an index 13_a_ whereby the slide may be rotated about the center of idler 23 to a compass position representing the wind direction.

If desired, the backing plate 5 may have any suitable known type of computer disc 5' pivotally connected thereto by a rivet 5_a_. As is well known in the art, the disc 5' may cooperate with the backing plate 5 to provide for altitude or track air speed and Mach number computations.

Referring now to FIG. 1, it will be noted that a typical problem is represented, the navigator knowing the following:

(1) True course—39 degrees
(2) Variation—6 degrees west
(3) Aircraft airspeed—130 m.p.h.
(4) Wind direction—150 degrees
(5) Wind velocity—20 knots The pilot needs to know:

(1) Magnetic course
(2) Magnetic heading—i.e., change in heading to compensate for sidewind effect
(3) Track speed Based on the known information, it will be noted that the variation ring 14 has been set so that index 15_a_ thereon points to 6° west variation, and the protractor ring 17 is set with the true course index 16_a_ directed toward 39°, as a result of which magnetic course index 8 is directed to 45°, thus accomplishing one of the objectives of the invention.

Next the aircraft air speed and side wind direction and velocity are considered, at random, as indicated by setting of the aircraft speed slide 3 at 130 m.p.h., orienting the 150° marking on the protractor ring and the longitudinal setting of the slide 13 is positioned to indicate 20 knots at the outer periphery of the snap ring retainer or at some other appropriate reference point. Such orientation and longitudinal setting of the wind speed slide effects automatic angular setting of the track speed scale 25 as well as the positioning of the idler 23 longitudinally of the track speed scale. By virtue of such setting, it will now be observed that the pointer of the track speed scale now indicates 10° drift left so that upon setting the drift ring index 18_a_ at 10° "DRIFT LEFT" the magnetic heading index 18_b_ is directed towards 45° on the protractor ring. In addition, the track speed is indicated within the idler 23 with reference to a center line marking 23_c_ therein to be 139 m.p.h. The invention has thus provided all of the above referred to unknowns pursuant to simple manipulation of the components of the invention without requiring mental or side conversions from knots to m.p.h., as with conventional devices, and without requiring pencil markings or special sequence of part manipulation in plotting a vector diagram, of which the center of the ring assembly is the apex of the primary vectors, i.e., aircraft and wind vectors, which are oriented relative to the protractor ring, while the longitudinal disposition of the wind speed slide and the related radial position of the track speed scale determine the length of the primary vectors, and the track speed scale, positioned as a function of orientation and longitudinal positioning of the wind speed slide, is the resultant of the primary vectors. The length of the resultant is indicated as track speed, i.e., aircraft airspeed corrected for wind effects.

Within the purview of the invention it is to be understood that reversibility of the aircraft speed scale may be eliminated. Similarly, the drift and variation rings may, if preferred, be eliminated.

Other changes and alterations may be resorted to without departing from the spirit of the invention as defined in the appended claims.

I claim:

1. A navigational computer device comprising a support, an elongated craft speed slide shiftably mounted in said support for longitudinal movement, means on said slide and said support for enabling adjustment of the longitudinal position of said slide to an indicated craft speed, a protractor, means rotatably supporting said protractor on said support overlying said craft speed slide, an index on said support adjacent said protractor to enable orientation of said protractor relative to the course of said craft, a second elongated slide, means mounting said second slide on said support for angular and longitudinal movement relative to said craft speed slide and said protractor, said second slide having means to enable longitudinal positioning thereof at an indicated position representative of a force acting on said craft and also having means for orienting the same relative to said craft speed slide and said protractor to an indicated direction, and an elongated member pivoted on said craft speed slide and pivotally and longitudinally movably connected to said second slide to be oriented responsive to orientation and longitudinal positioning of said second slide, and means for indicating on said elongated member the resultant speed of said craft.

2. A navigational computer as defined in claim 1, wherein said elongated member and said craft speed slide comprise means for indicating drift of said craft resulting from said force being lateral to the heading of said craft.

3. A navigational computer as defined in claim 2, comprising means cooperative with said protractor to indicate craft heading as a result of drift thereof.

4. A navigational computer as defined in claim 1, comprising means cooperative with said protractor for enabling setting of said protractor to compensate for magnetic variation.

5. A navigational computer as defined in claim 1, comprising a drift ring rotatable relative to said protractor to a position to cooperate with said protractor to indicate craft heading as a result of drift thereof, and a variation ring rotatable relative to said protractor and said drift ring and cooperative with said protractor to enable setting of said protractor to compensate for magnetic variation.

6. A vector computer comprising first and second elongated primary vector members, means supporting said members for longitudinal movement and for relative angular movement, said supporting means and said first vector member having means cooperative to indicate a selected relative longitudinal position of said first vector member and the supporting means, a protractor on said supporting means for orienting said second vector member at a known angle relative to said first vector member, said supporting means including a hub, said protractor being in the form of a ring extended about said hub, with one of said vector members extending diametrically beyond said hub and confining said ring therein, an elongated resultant member, means connecting said resultant member to said first vector member for longitudinal movement therewith and for relative angular movement therebetween, and means connecting said resultant member to said second vector member for effecting angular movement of said resultant member upon relative longitudinal movement and upon relative angular movement between said first and second vector members and for allowing movement of said second vector member longitudinally of said resultant member upon such relative movement between said first and second vector member, the magnitude of said angular movement of said resultant member being governed by said selected longitudinal position of said first vector member.

References Cited by the Examiner

UNITED STATES PATENTS

| | | | |
|---|---|---|---|
| 1,661,095 | 2/28 | Rowe | 33—98 |
| 1,843,978 | 2/32 | Hensey | 33—76 |
| 2,193,280 | 3/40 | Gunning | 235—61 |
| 2,244,125 | 6/41 | Siefker | 33—98 |
| 2,433,249 | 12/47 | Van Sciever | 33—76 |
| 2,460,713 | 1/49 | Richardson | 33—98 |

FOREIGN PATENTS

| | | |
|---|---|---|
| 247,868 | 6/12 | Germany. |
| 599,260 | 3/48 | Great Britain. |

ISAAC LISANN, *Primary Examiner.*

UNITED STATES PATENT OFFICE

CERTIFICATE OF CORRECTION

Patent No. 3,230,101 January 18, 1966

Allen M. Alper et al.

It is hereby certified that error appears in the above numbered patent requiring correction and that the said Letters Patent should read as corrected below.

Column 5, line 32, for "molden" read -- molten --.

Signed and sealed this 17th day of May 1966.

(SEAL)
Attest:

ERNEST W. SWIDER
Attesting Officer

EDWARD J. BRENNER
Commissioner of Patents